Figure 1:
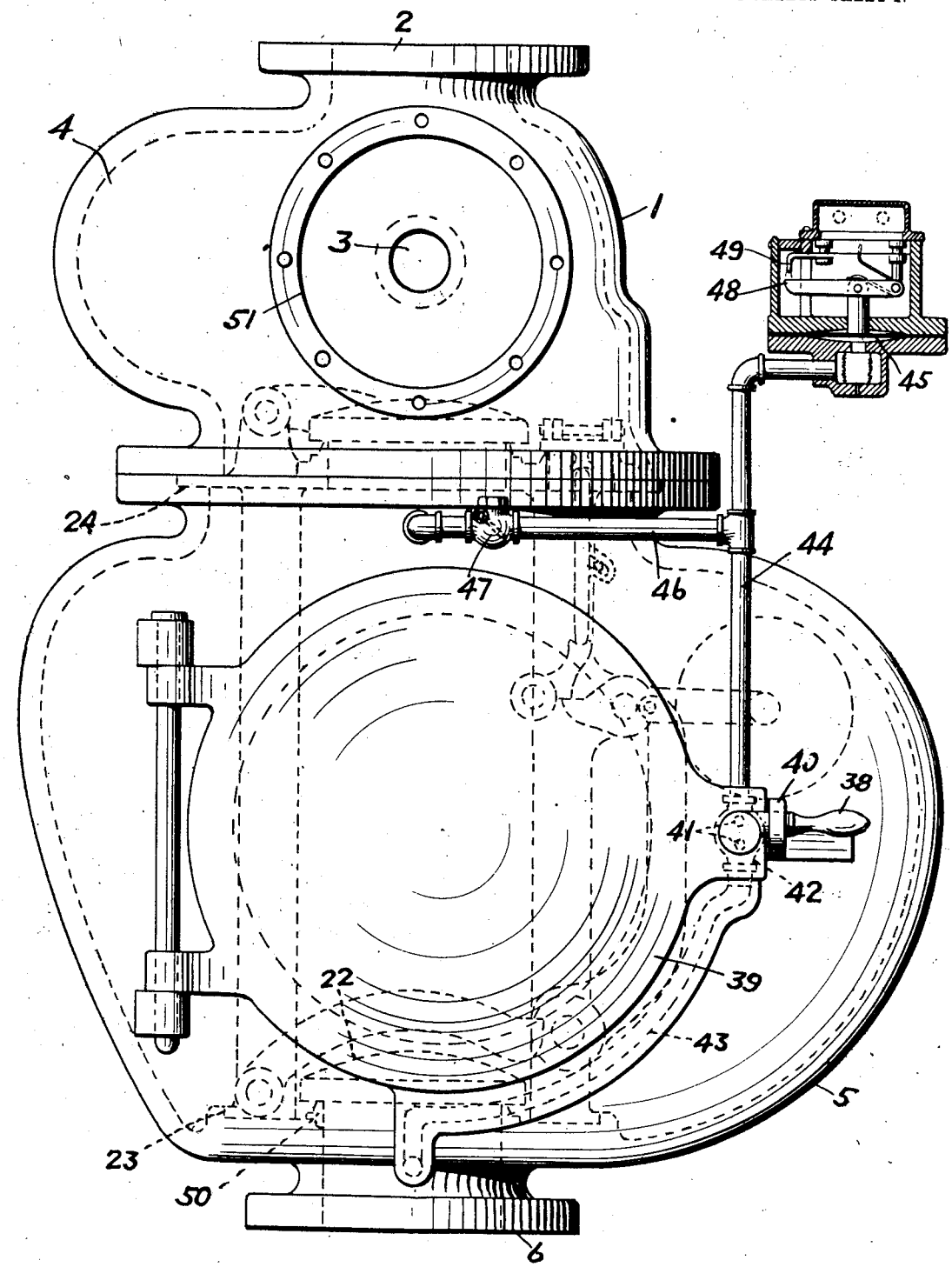

A. C. ROWLEY.
DRY PIPE VALVE FOR FIRE EXTINGUISHING SYSTEMS.
APPLICATION FILED APR. 26, 1913.
1,108,106.
Patented Aug. 18, 1914.
2 SHEETS—SHEET 2.
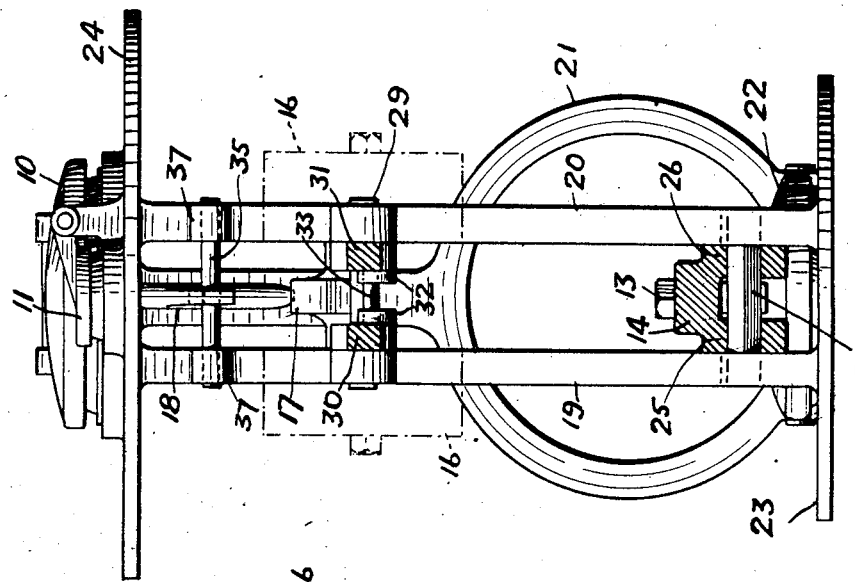
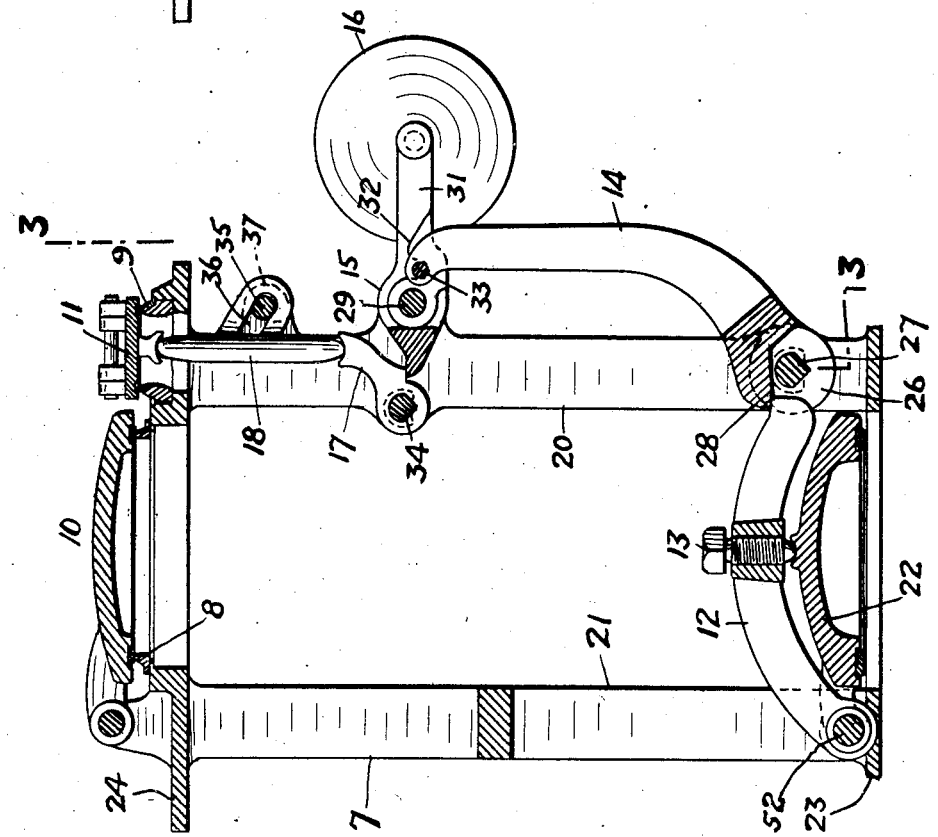
WITNESSES:
Rob R Ketchel
Frank E French
INVENTOR
Arthur C. Rowley
BY
Augustus B Stoughton
ATTORNEY.

UNITED STATES PATENT OFFICE.

ARTHUR C. ROWLEY, OF PHILADELPHIA, PENNSYLVANIA, ASSIGNOR TO ASSOCIATED AUTOMATIC SPRINKLER COMPANY, OF PHILADELPHIA, PENNSYLVANIA, A CORPORATION OF DELAWARE.

DRY PIPE-VALVE FOR FIRE-EXTINGUISHING SYSTEMS.

1,108,106.  Specification of Letters Patent.  Patented Aug. 18, 1914.

Application filed April 26, 1913. Serial No. 763,744.

*To all whom it may concern:*

Be it known that I, ARTHUR C. ROWLEY, a citizen of the United States, and a resident of Philadelphia, in the county of Philadelphia and State of Pennsylvania, have invented certain new and useful Improvements in Dry Pipe-Valves for Fire-Extinguishing Systems, of which the following is a specification.

The principal objects of the present invention are to improve and simplify the construction, arrangement and mode of operation of the parts of the valve; to provide a valve of the kind mentioned in which all of the working parts are entirely closed in the valve chamber thus preventing any tampering with the valve either maliciously or carelessly and also preventing any possibility of interference with the operation of the valve when once set up ready for service; to provide an ample passage for water; to reduce the number of parts to a minimum; to provide for ease of repairing and accessibility for the renewal of parts, and to enable the working parts to be made and assembled prior to their introduction into the valve casing.

The invention will be claimed at the end hereof, but will first be described in connection with the embodiment of it chosen from among other embodiments for illustration in the accompanying drawings, in which—

Figure 1, is a side view partly in section of a valve embodying features of the invention. Fig. 2, is a side view, partly in section, illustrating the principal working parts which are assembled as a unit without the casing, and Fig. 3, is a sectional view, taken on the line 3—3 of Fig. 2.

In the drawings 1 is the air chamber section of the casing and it is adapted for connection to the sprinkler system, for example, by means of the flanged portion 2.

3 is a drain opening and 4 is a clapper receptacle.

5, is the lower chamber section of the casing and it is adapted for connection to the water supply as by means of a flanged connection 6.

7, Figs. 2 and 3, is an interior removable frame clamped between the sections 1 and 5 and provided with air and releasing seats 8 and 9 which may be of any appropriate material. Air and releasing clappers 10 and 11 are pivotally connected with the frame 7 and appropriately arranged for coöperation with the seats. The space in the clapper receptacle 4 accommodates the clapper 10, when opened. The clamp 12 with its adjusting screw 13, the hook 14, the operating lever 15 with its counter-weight 16, the tumbler 17, the strut 18 and the water clapper 22, are appropriately connected with the frame 7 and may be assembled thereon prior to the inclusion of the frame in the casing. One side of the frame consists of two bars 19 and 20 and the other side consists of a bar 21 bowed to accommodate the water clapper 22.

23 and 24 are end flanges on the frame. The flange 23 is fitted to a seat in the part 5 of the casing and the flange 24 carries the valve seat 8 and is clamped between the two parts of the casing. It being understood that the parts connected with the frame are permitted to assume the positions that they occupy when the part 11 is released, so that they all fall within the flanges 23 and 24. The parts 1 and 5 of the casing are disconnected and the frame is inserted from the top. Thereafter the parts connected with the frame may be positioned as shown in Fig. 2, by opening the door that will be hereinafter described. The parts 12 and 22 are pivoted at 52. The hook is bifurcated at its lower end forming two branches 25 and 26 pivoted to the knife edge 27. Between these branches 25 and 26 is the hook proper 28 which detachably engages the free end of the bar 12. The operating lever is pivoted at 29 intermediate of its ends between the bars 19 and 20 and is provided at one end with counter-weights 16. The outer end of the operating lever is bifurcated, forming branches 30 and 31 and between these branches and on the opposing inner faces of them are seats 32 which detachably receive a pin 33 on the hook 14. The tumbler 17 is pivoted to a knife edge 34 between the bars 19 and 20 and detachably engages the inner end of the operating lever. The strut 18 is movably connected by means of a pin 35, movable in slots 36 in brackets 37 on the arms 19 and 20.

38 is a handle pivoted to the door 39 and adapted to pass under a hook-like catch 40, so as to permit of fastening and unfastening the door. The handle 38 is pivoted in the door and has pins or projections 41 on its inner face which take into cavities in the plug of the valve 42. The valve 42 is interposed in a channel 43 formed in the door frame and communicating with the interior below the water clapper 22. This channel communicates with a pipe 44 that leads beneath the diaphragm 45 and a branch pipe 46 leads from the pipe 44 to the interior of the casing above the water clapper 22 and is provided with a check valve 47 opening in the direction of the pipe 44. Above the diaphragm and connected with it is a contact 48 which, when the diaphragm is elevated, closes a circuit, not shown, at the contact 49; thus giving a signal or alarm. The seat 50 for the water clapper 22 is arranged at the base of the section 5.

Evidently the various working parts may be assembled on the frame 7 and the latter with the assembled parts, put inside of the casing, by separating the parts 1 and 5 thereof, putting the frame in through the top of the part 5 and then putting on the part 1, so that the flange 24 is clamped between the two parts 1 and 5 when they are secured together by bolts or the like, which are not shown. It will be understood, of course, that in use a plate is applied to cover the opening 51.

Assuming that the parts are in the position shown, the air pressure in the casing 1 restrains the weight 16 and the water clapper 22 is held closed to the degree of tightness determined by the set-screw 13. If the air pressure goes off, for example, by reason of a fire, the releasing clapper in the absence of the air pressure is free to open, and in doing so releases the strut 18 permitting it to rise and free the tumbler 17, which frees the operating lever 15 permitting it to fall under the influence of the weight 16. Thus the pin and its seat, 33 and 32 are detached, the hook 14 turns toward the right releasing the clamp 12 and so permitting the water clapper to open under the pressure of the water which freely flows through the valve to the extinguisher system. Water, under these circumstances, flows past the check valve 47 and actuates the alarm by closing the contacts 48 and 49 in the manner described. After the water has been shut off by a valve, not shown, on the water inlet side of the valve, the parts are reset. For this purpose the handle 38 is turned up from under the hook-like catch 40 and the door 39 may be opened. If the door should thereafter, or at any time, be left open and the water turned on to the valve, an alarm would be sounded because when the handle 38 was turned it turned the plug of the valve 42 thus opening the water way 43 to the alarm device. The plug of the valve 42 is only closed when the handle has been turned under the hook 40.

It will be obvious to those skilled in the art to which my invention relates that modifications may be made in details without departing from the spirit thereof, hence I do not limit myself as to details or in any way further than the prior state of the art may require, but

What I claim is:

1. A dry pipe valve comprising the combination of an air chamber section adapted for connection to the sprinkler system, a lower chamber section adapted for connection to the water supply and to the first mentioned section, an interior removable frame having a flange clamped between said sections and provided with air and releasing seats, air releasing and water clappers and a clamp provided with an adjusting screw all pivoted to the frame, and suitable mechanism interposed between the releasing clapper and the clamp and connected with the frame, substantially as described.

2. In a dry pipe valve the combination of a removable frame having a flange, a water clapper clamp and its adjusting screw pivoted to the frame, a releasing clapper pivotally connected with the frame, and a hook and weighted operating lever and tumbler and strut interposed between the releasing clapper and clamp and respectively connected with the frame and collectively constituting operating mechanism, and a housing consisting of two detachably connected parts between which the flange is clamped, substantially as described.

3. In a dry pipe valve the combination of a two-part casing, a removable frame provided at its ends with flanges whereof one is seated in one part of the casing and the other is clamped between the two parts of the casing, and operating mechanism including water and release clappers and their interconnecting mechanism carried by the frame, said frame and its connected parts insertable and removable through the opening in one of the parts that is opened and closed by the other of the parts.

4. In a dry pipe valve the combination of a casing consisting of two parts detachably connected together, a frame that can pass through the opening in one of the parts that is covered by the other of the parts so as to be mounted in the casing, and a part of said frame clamped between the two parts, and release and water clappers and their complementary mechanism carried by the frame and inclosed in the casing.

5. In a dry pipe valve the combination of a two-part casing, a removable frame comprising a side piece consisting of bars and a bowed side piece and end flanges, a clamp and water clapper pivoted to the frame and adapted to pass through the bowed part thereof, a release clapper, and mechanism carried between the arms of the side of the frame and interposed between the clapper and clamp and said frame adapted to be inserted through one of said two parts and to have a part of it engaged or clamped between said two parts, substantially as described.

In testimony whereof I have hereunto signed my name in the presence of two witnesses.

ARTHUR C. ROWLEY.

Witnesses:
CLIFFORD K. CASSEL,
FRANK E. FRENCH.